US008711835B2

(12) United States Patent
Li et al.

(10) Patent No.: US 8,711,835 B2
(45) Date of Patent: Apr. 29, 2014

(54) OFDM CONTROL SIGNALING IN THE PRESENCE OF TIMING ASYNCHRONIZATION IN A PEER-TO-PEER NETWORK

(75) Inventors: Junyi Li, Chester, NJ (US); Rajiv Laroia, Far Hills, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 12/964,191

(22) Filed: Dec. 9, 2010

(65) Prior Publication Data

US 2011/0310882 A1 Dec. 22, 2011

Related U.S. Application Data

(63) Continuation of application No. 11/775,782, filed on Jul. 10, 2007, now abandoned.

(51) Int. Cl.
*H04J 3/06* (2006.01)
*H04B 7/212* (2006.01)

(52) U.S. Cl.
USPC .......................................... 370/350; 370/324

(58) Field of Classification Search
USPC ......... 370/350–356, 304, 324, 338, 503–514, 370/319, 320, 335, 336, 342, 344, 208; 455/13.2, 41.2, 502, 550.1, 552.1, 455/553.1, 556.1, 556.2, 557, 127.4, 151.2; 375/353–377, 727
See application file for complete search history.

(56) References Cited

U.S. PATENT DOCUMENTS

| | | | |
|---|---|---|---|
| 6,628,697 B1 * | 9/2003 | Douglas et al. | 375/139 |
| 7,072,289 B1 * | 7/2006 | Yang et al. | 370/208 |
| 7,965,798 B2 * | 6/2011 | Roh et al. | 375/343 |
| 2003/0151547 A1 * | 8/2003 | Mauro et al. | 342/357.15 |
| 2004/0228311 A1 | 11/2004 | Sugaya et al. | |
| 2006/0120468 A1 | 6/2006 | Lin et al. | |
| 2007/0058524 A1 * | 3/2007 | Modlin et al. | 370/208 |
| 2007/0058758 A1 | 3/2007 | Ishii | |
| 2007/0237274 A1 * | 10/2007 | Nakache et al. | 375/355 |
| 2008/0031220 A1 | 2/2008 | Li et al. | |

FOREIGN PATENT DOCUMENTS

| | | |
|---|---|---|
| EP | 1533950 A1 | 5/2005 |
| JP | 2005253038 A | 9/2005 |
| JP | 2006020072 A | 1/2006 |
| JP | 2006211034 | 8/2006 |
| JP | 2006523408 A | 10/2006 |
| JP | 2007509530 A | 4/2007 |
| JP | 2007522692 A | 8/2007 |

(Continued)

OTHER PUBLICATIONS

International Search Report, PCT/US08/069082, International Search Authority, European Patent Office, Oct. 28, 2008.

(Continued)

*Primary Examiner* — San Htun
(74) *Attorney, Agent, or Firm* — James K. O'Hare

(57) ABSTRACT

Systems and methodologies are described that facilitates mitigating the affects of asynchronous behavior when transmitting a data signal. According to various aspects, the system and methods are employed for selectively appending an appropriate time-shifting mechanism to a data signal in order to rectify the negative affects of asynchronous time behavior during a logical data burst.

14 Claims, 14 Drawing Sheets

(56) References Cited

FOREIGN PATENT DOCUMENTS

| | | |
|---|---|---|
| JP | 2009509451 A | 3/2009 |
| WO | WO2005039105 A1 | 4/2005 |
| WO | WO2005039127 A1 | 4/2005 |
| WO | WO06009713 | 1/2006 |
| WO | WO-2006006238 A1 | 1/2006 |
| WO | WO2006043242 | 4/2006 |
| WO | WO-2007066293 A2 | 6/2007 |

OTHER PUBLICATIONS

Jimenez et al., "Multi-user Synchronisation in ad hoc OFDM-based Wireless Personal Area Networks," Wireless Personal Communications, Aug. 23, 2006, pp. 387-399, vol. 40, No. 3, Kluwer Academic Publishers, DO, XP019468837.

Written Opinion, PCT/US08/069082, International Search Authority, European Patent Office, Oct. 28, 2008.

\* cited by examiner

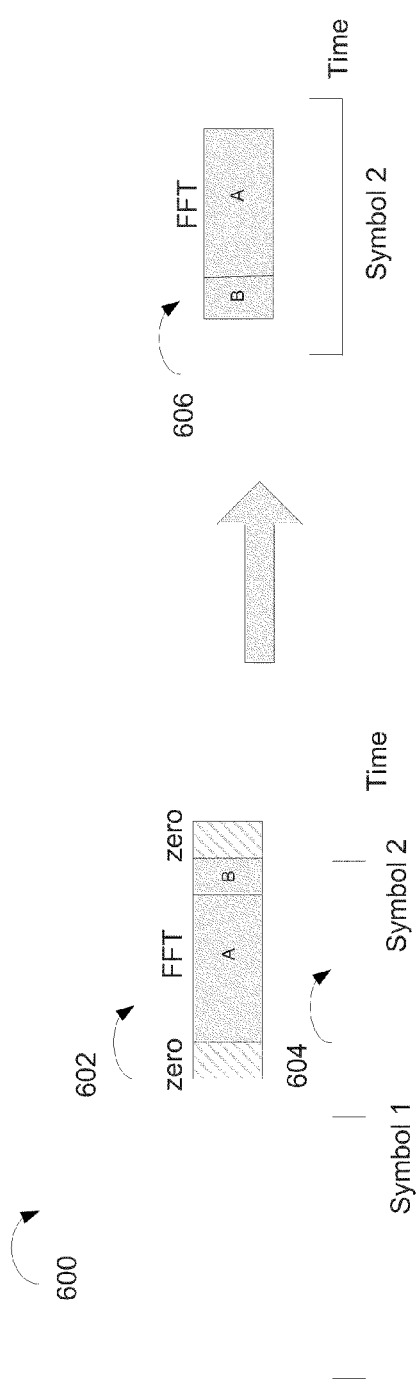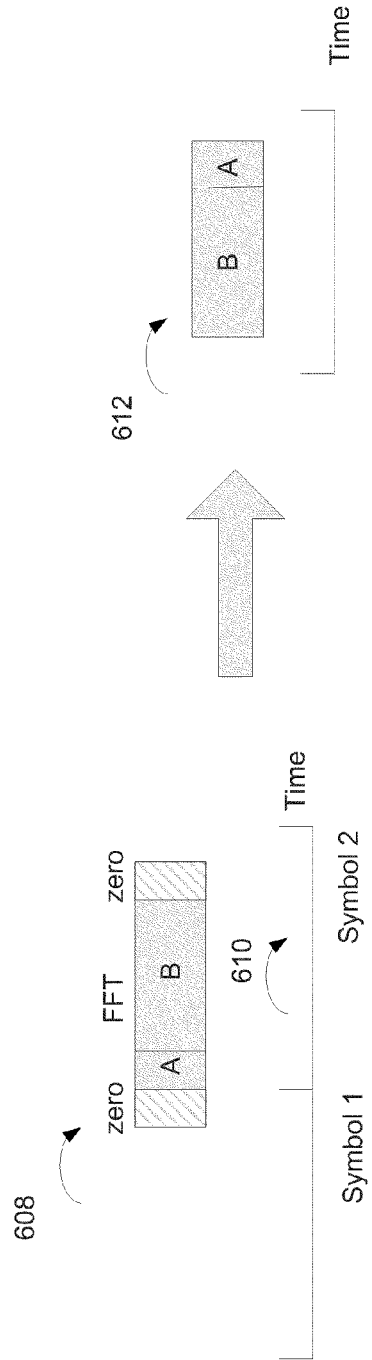
FIG. 6a
FIG. 6b

OFDM CONTROL SIGNALING IN THE PRESENCE OF TIMING ASYNCHRONIZATION IN A PEER-TO-PEER NETWORK

CROSS-REFERENCE TO RELATED APPLICATION(S)

This application is a continuation of pending U.S. Utility application Ser. No. 11/775,782, entitled "OFDM Control Signaling in the Presence of Timing Asynchronization in a Peer-to-Peer Network" filed on Jul. 10, 2007, which is expressly incorporated by reference in its entirety.

BACKGROUND

Field

The following description relates generally to wireless communications, and more particularly to schemes for mitigating the affects of asynchronous time behavior to data signal transmission.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Wireless communication systems have become a prevalent means by which majority of people worldwide have come to communicate. Wireless communication devices have become smaller and more powerful in order to meet consumer needs, improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal.

During normal synchronous operation in an ad hoc network, seamless transmission of data amongst mobile terminals is a common occurrence. However, whenever the time becomes asynchronous, errors in data transmission can occur. A need in the art exists for mitigating data transmission error. Ideally, time is synchronous throughout the four-step logical burst, however, on many occasions this is not the case. More specifically, a need in the art exists for alleviating asynchronous time behavior in the pre-preamble portion of the logical burst.

According to another example, wireless communication systems oftentimes employ peer-to-peer or ad hoc architectures whereby a wireless terminal may transfer signals directly to another wireless terminal. As such, signals need not traverse through a base station; rather, wireless terminals within range of each other may discover and/or communicate directly. Peer-to-peer networks may leverage various portions of wireless spectrum for transferring data. However, wireless spectrum is an expensive and valuable resource. Moreover, conventional peer-to-peer networks typically communicate in an inefficient manner that yields wireless spectrum related waste.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating operating a wireless terminal in a peer-to-peer network, comprising determining that a transmitting first mobile terminal and one or more receiving mobile terminals are communicating in an asynchronous manner; and employing a time-shifting mechanism to a data signal transmitted by the first mobile terminal, wherein the mechanism alerts the one or more receiving mobile terminals of the length of the data signal.

In accordance with an aspect, a wireless communications apparatus is described herein. The apparatus may comprise a memory that retains instructions related to detecting that a transmitting first mobile terminal and one or more receiving mobile terminals are communicating in an asynchronous manner, the memory further retains instructions for selectively employing a time-shifting mechanism to a data signal transmitted by the first mobile terminal, wherein the mechanism alerts the one or more receiving mobile terminals of the length of the data signal; and a processor, coupled to the memory, configured to execute the instructions retained in the memory.

In accordance with another aspect, a wireless communications apparatus that enables operating a wireless terminal in a peer-to-peer network is described herein. The apparatus may comprise means for determining that a transmitting first mobile terminal and one or more receiving mobile terminals are communicating in an asynchronous manner; and means for employing a time-shifting mechanism to a data signal transmitted by the first mobile terminal, wherein the mechanism alerts the one or more receiving mobile terminals of the length of the data signal.

In accordance with an aspect, a machine-readable medium having stored thereon machine-executable instructions for determining that a transmitting first mobile terminal and one or more receiving mobile terminals are communicating in an asynchronous manner; and employing a time-shifting mechanism to a data signal transmitted by the first mobile terminal, wherein the mechanism alerts the one or more receiving mobile terminals of the length of the data signal.

In accordance with another aspect, a wireless communication system comprising an apparatus is described. The apparatus can comprise a processor configured to determine that a transmitting first mobile terminal and one or more receiving mobile terminals are communicating in an asynchronous manner; and employ a time-shifting mechanism to a data signal transmitted by the first mobile terminal, wherein the mechanism alerts the one or more receiving mobile terminals of the length of the data signal.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIGS. 6A AND 6B illustrates how the signal formats described in FIG. 4 and the receiver algorithm described in FIG. 5 help to rectify the negative effects of timing mismatch.

DETAILED DESCRIPTION

Figure 1:
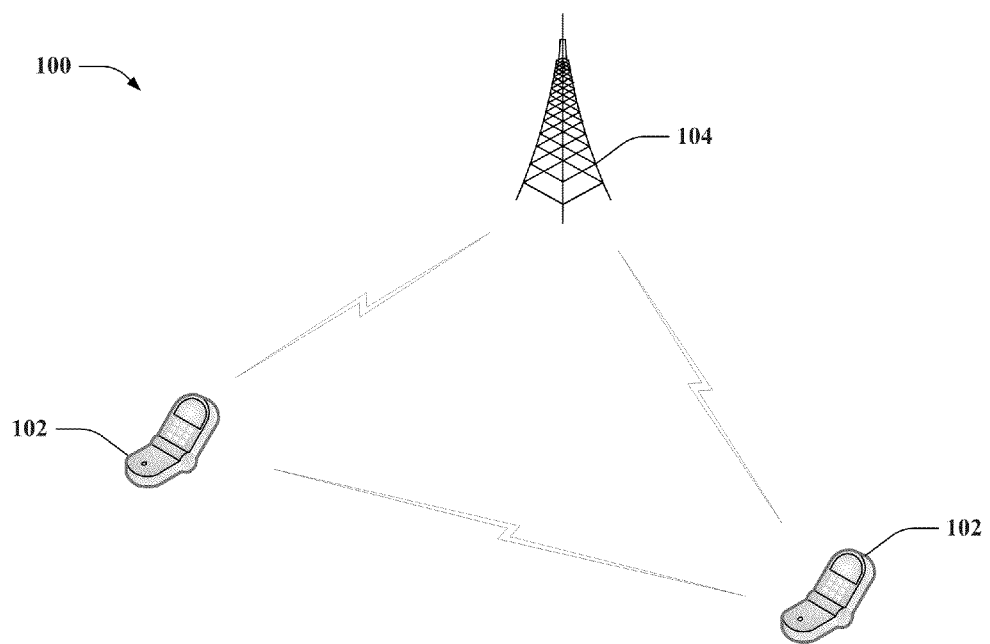
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise one or more wireless terminals 102. Although two wireless terminals 102 are depicted, it is to be appreciated that system 100 may include substantially any number of wireless terminals 102. Wireless terminals 102 can be, for example, cellular phones, smart phones, laptops, handheld communication devices, handheld computing devices, satellite radios, global positioning systems, PDAs, and/or any other suitable device for communicating over wireless communication system 100. Wireless terminals 102 can communicate directly with each other via a local area peer-to-peer (P2P) network (e.g., ad hoc network). Peer-to-peer communication may be effectuated by directly transferring signals between wireless terminals 102; thus, the signals need not traverse through a base station (e.g., base station 8 104). The peer-to-peer network may provide short range, high data rate communication (e.g., within a home, office, etc. type setting).

Further, system 100 may support a wide area network (WAN). System 100 may include a base station 104 (e.g., access point) and/or any number of disparate base stations (not shown) in one or more sectors that receive, transmit, repeat, etc. wireless communication signals to each other and/or to one or more wireless terminals 102. Base station 104 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Wireless terminal(s) 102 may transmit signals to and/or receive signals from base station 104 when communicating via the wide area infra-structure network supported by system 100.

Peer-to-peer communication between wireless terminals 102 may be synchronous. For example, wireless terminals 102 may utilize a common clock reference to synchronize performance of distinct functions. Wireless terminals 102 may obtain timing signals from base station 104 (and/or a transmitter (not shown) that provides less functionality) utilized to synchronize operation of wireless terminals 102. Wireless terminal 102 may obtain timing signals from other sources, for instance, GPS satellites. According to an illustration, time may be meaningfully partitioned in a peer-to-peer network for functions such as peer discovery, paging, and traffic. Further, it is contemplated that each peer-to-peer network may set its own time.

Before communication of traffic in a peer-to-peer network can take place, wireless terminals 102 (e.g., peers) may detect and identify each other. The process by which this mutual detection and identification between peers takes place may be referred to as peer discovery. System 100 may support peer discovery by providing that peers desiring to establish peer-to-peer communication periodically transmit short messages and listen to the transmissions of others. For example, each one of the wireless terminals 102 (e.g., sending wireless terminal) may periodically send signals to the other wireless terminal(s) 102 (e.g., receiving wireless terminal(s)) in the peer-to-peer network so that the receiving wireless terminal(s) may identify the sending wireless terminal when the receiving wireless terminal(s) are in vicinity of the sending wireless terminal. After identification, an active connection may be established.

Transmissions for peer discovery may periodically occur during specified times referred to as peer discovery intervals, the timing of which may be predetermined by a protocol and known to wireless terminals 102. Wireless terminals 102 may each transmit respective signals to identify themselves. For example, each wireless terminal 102 may send a signal during a portion of a peer discovery interval. Further, each wireless terminal 102 may monitor signals potentially transmitted by other wireless terminals 102 in a remainder of the peer discovery interval. According to an example, the signal may be a beacon signal. By way of another illustration, the peer discovery interval may include a number of symbols (e.g., OFDM symbols). Each wireless terminal 102 may select at least one symbol in the peer discovery interval for transmission by that wireless terminal 102. Moreover, each wireless terminal 102 may transmit a corresponding signal in one tone in the symbol selected by that wireless terminal 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

Figure 2:
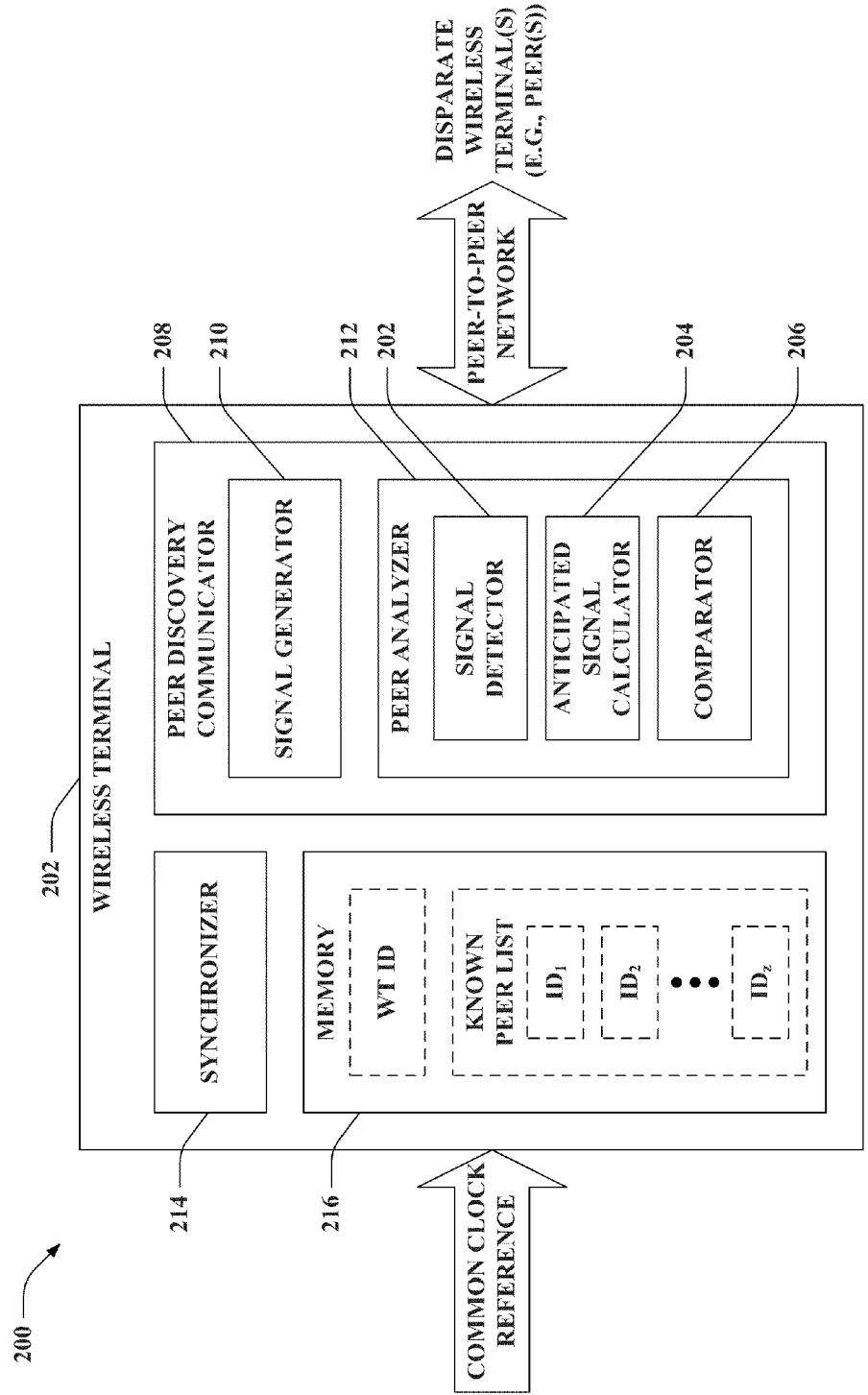
FIG. 2 is an illustration of an example system that utilizes a function for encoding peer discovery signals communicated and evaluated in a peer-to-peer network.

Referring now to FIG. 2, illustrated is a system 200 that utilizes a function for encoding peer discovery signals communicated and evaluated in a peer-to-peer network. The function may be irreversible; however, it is contemplated that a reversible function may be utilized in connection with system 200. System 200 includes wireless terminal 202 that may communicate via a peer-to-peer network with disparate wireless terminal(s) (e.g., peer(s)). Wireless terminal 202 may include peer discovery communicator 208 that enables sending and/or obtaining peer discovery signals during a peer discovery interval (e.g., by leveraging signal generator 210 and peer analyzer 212). Further, wireless terminal 202 may include synchronizer 214 that obtains and analyzes a common clock reference to coordinate performance of various functions (e.g., peer discovery, paging, traffic) and determine a meaningful notion of time (e.g., time counter) consistent with disparate wireless terminals in the peer-to-peer network. Therefore, peers get the same timing (timing synchronized) without directly communicating with each other.

Moreover, wireless terminal 202 may include memory 216. An identifier related to wireless terminal 202 (WT ID) may be stored in memory 216. Additionally, a known peer list (e.g., buddy peer list) may be maintained in memory. The known peer list may include identifiers (e.g., $ID_1, ID_2, \ldots, ID_z$, where z may be any integer) corresponding to buddy peers that may or may not be located within the peer-to-peer network (e.g., within range of wireless terminal 202) at a given time. For example, a subset, none or all of the disparate wireless terminals in the peer-to-peer network with wireless terminal 202 may be buddy peers of wireless terminal 202; thus, memory 216 of wireless terminal 202 may maintain ID's corresponding to such disparate wireless terminals that are buddy peers. By way of further example, an identifier may be lacking from the known peer list in memory 216 of wireless terminal 202 for any disparate wireless terminal(s) (e.g., in the peer-to-peer network with wireless terminal 202) that is not a buddy peer of wireless terminal 202.

Signal generator 210 (and/or similar signal generator(s) of disparate wireless terminal(s) in the peer-to-peer network) may employ an irreversible function (e.g., irreversible hash function) to yield a peer discovery signal. Since the function is irreversible, a receiving wireless terminal may be unable to decipher the identifier from an obtained peer discovery signal; rather, a known identifier may be subjected to the same irreversible function and the output may be compared with a received signal. By way of example, signal generator 210 may utilize an identifier of wireless terminal 202 (WT ID) (e.g., wireless terminal that generates the peer discovery signal) and a time variable (e.g., time counter) that relates to a current peer discovery interval (e.g., as determined by synchronizer 214) as input to the irreversible function to derive a symbol position and/or a tone position for the peer discovery signal. Likewise, similar signal generator(s) may employ respective identifiers that correspond to each disparate wireless terminal. Further, the encoded peer discovery signal may be broadcast over the peer-to-peer network. Thus, for example, broadcast peer discovery signal(s) yielded by signal generator(s) of the disparate wireless terminal(s) in the peer-to-peer network may be received by wireless terminal 202.

Peer analyzer 212 may further include a signal detector 202, an anticipated signal calculator 204, and/or a comparator 206. Signal detector 202 may receive signal(s) communicated over the peer-to-peer network during a peer discovery interval. For example, the received signal(s) may include peer discovery signal(s) sent by disparate wireless terminal(s) (e.g., buddy peers or non-buddy peers), interference, and so forth.

Moreover, anticipated signal calculator 204 may generate current expected signal formats for each buddy peer. In the case of using beacon signals, anticipated signal calculator 204 may determine a coordinate pair of an expected, selected symbol position (e.g., x coordinate) and a corresponding expected, selected tone position (e.g., y coordinate) for each buddy peer. For example, the irreversible function employed by signal generator 210 may similarly be utilized by anticipated signal calculator 204 to yield the expected coordinate pairs associated with each buddy peer. Additionally, anticipated signal calculator 204 may generate the expected coordinate pair for each buddy peer as a function of the time variable (e.g., time counter) and the respective identifier corresponding to the buddy peer. It is possible that a different function may be employed for a different buddy peer. For example, suppose that wireless terminal 202 has two buddy peers. It is known to wireless terminal 202 that the first buddy peer uses a first function to generate its signal and the second buddy peer uses a second function to generate its signal. The first and the second functions may be the same or may be different. As long as the first and the second functions are predetermined and known, wireless terminal 202 can derive the expected signals from the first and the second buddy peers.

Comparator 206 compares detected signal(s) (e.g., obtained with signal detector 202) with calculated, expected signal formats (e.g., determined by anticipated signal calculator 204) to yield a probability associated with buddy peer(s) being in a vicinity of wireless terminal 202 (e.g., buddy peer being one of the disparate wireless terminal(s) included in a shared peer-to-peer network). If a detected signal matches the expected signal format of one of the buddy peers, comparator 206 may record that there is a possibility the corresponding buddy peer may be in the vicinity (e.g., within the peer-to-peer network). If the expected signal format of the same buddy peer is observed by comparator 206 in several peer discovery intervals, then the probability of the buddy peer being in the vicinity may be high. Moreover, if an expected signal format does not match any detected signal, the buddy peer corresponding to the expected signal format may be located outside of the peer-to-peer network (e.g., out of range of wireless terminal 202). Further, if a detected signal does not match any expected signal format, this detected signal may not relate to a buddy peer; rather, the detected signal may pertain to a non-buddy peer, noise, and so forth.

By way of another example, a list of plain-text names of buddy peers associated with wireless terminal 202 may be maintained in memory 216 (e.g., known peer list). Further, upon decoding a particular ID with signal detector 202, anticipated signal calculator 204 may hash the plain-text buddy names from memory 216 using the current counter value. If at least one of the output IDs matches the decoded ID, comparator 206 may conclude that the corresponding buddy peer is present with a certain probability. If no match is found or there are multiple matches, comparator 206 may be unable to conclude as to the presence of any buddy peers. Moreover, each peer may vary a number of bits of an output of the ID generating hash function in order to ensure that it is eventually discovered.

Figure 3:
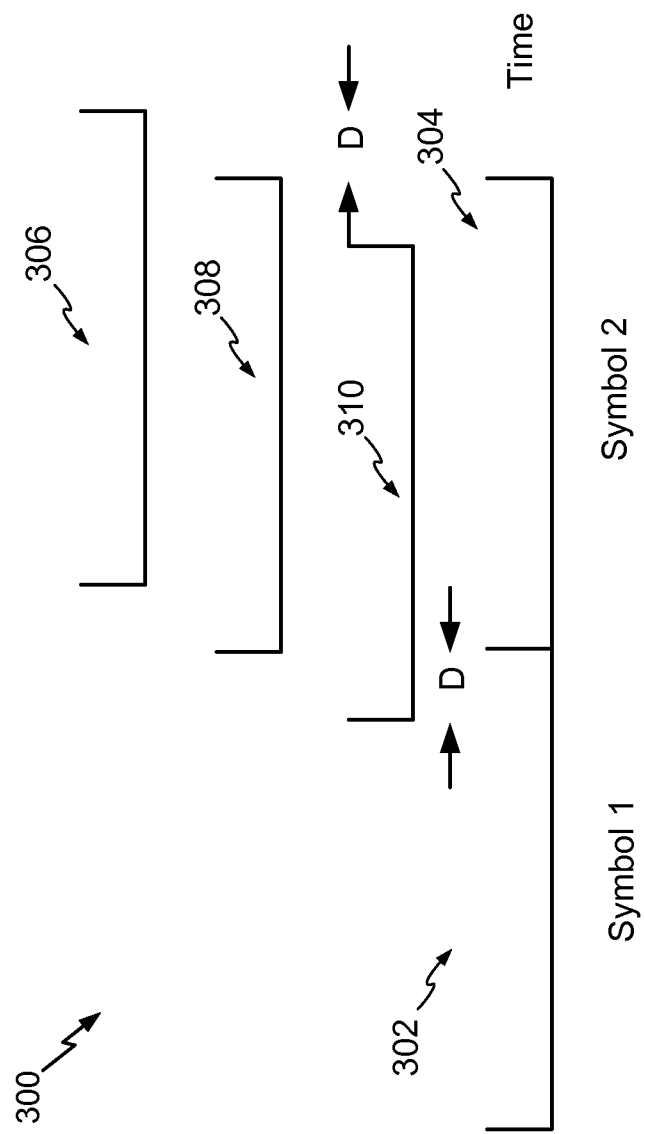
FIG. 3 is an example scenario of a timing mismatch between a signal and a receiver of that signal in a wireless communications environment.

FIG. 3 illustrates an example scenario of a timing mismatch between a signal and a receiver of that signal in a wireless communications environment. In one aspect, a wireless terminal transmits a signal, which is to be received by another wireless terminal. Receiver symbol time intervals 302 and 304 represent two consecutive symbols, symbol 1 and symbol 2. It is to be appreciated that the time intervals 302 and 304 are determined by the receiver, and may not be aligned with the received signal, for example, because of a timing mismatch between the transmitting terminal and the receiving terminal. Additionally, the timing mismatch can occur because of a propagation delay between the transmitting terminal and the receiving terminal. FIG. 3a illustrates three scenarios for received signals 306, 308 and 310 for symbol 2. The received signal 306 is behind the receiver symbol time interval 304 by an amount of D, the received signal 308 is exactly aligned with the receiver symbol time interval 304, and the received signal 310 is ahead of the receiver symbol time interval 304. As will be described infra, any negative effects of a timing mismatch between a transmitting terminal and receiving terminal, such as illustrated by received signals 306, 308 and 310, can be rectified by employing various time-shifting procedures prior to signal processing at a receiving terminal.

Figure 4A:
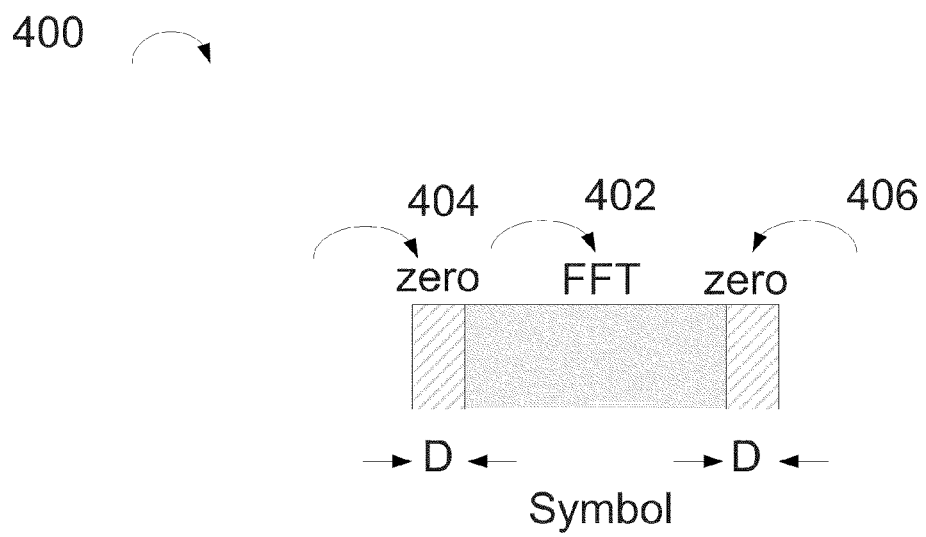
FIGS. 4A and 4B is an example signal format scheme to rectify the negative effect of timing mismatch between a transmitting computer terminal a receiving computer terminal.
Figure 4B:
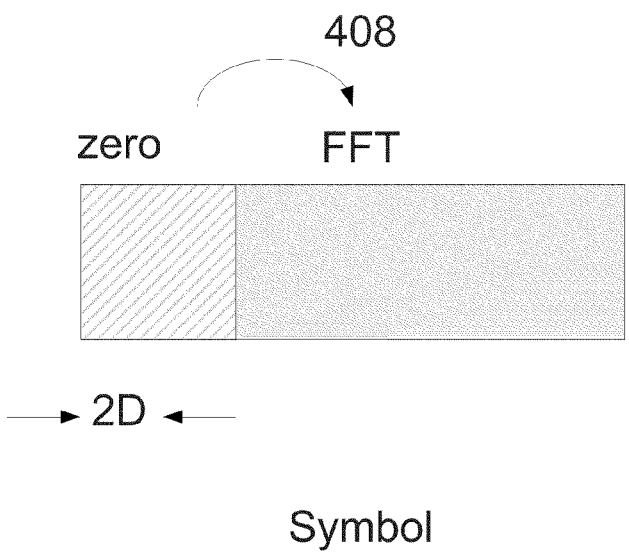

FIG. 4a shows a signal format scheme to rectify the negative effect of timing mismatch between a transmitting computer terminal a receiving computer terminal. FIG. 4a illustrates one symbol 400, however, it is to be appreciated that the signal formatting scheme can be applied to any number of symbols. The symbol 400 includes an FFT portion 402, which include signal energy. In an OFDM system, for example, the FFT portion includes one or a plurality of tone signals (e.g., sinusoids at specific tone frequencies). In a preferred embodiment, the FFT portion includes an integer number of periods of those tone signals. The symbol 400 can include two zero-energy portions 404 and 406, before and after the FFT portion 402. It is to be appreciated that the zero-energy portions 404 and 406 may both occur only prior to the FFT portion 402, or only after the FFT portion 402. In one aspect, the length of the zero-energy portion is determined as a function of the expected amount of the (maximum) timing mismatch. For example, if the first and the second scenarios in FIG. 3 are the two extreme timing mismatches, and D is the maximum timing mismatch, then in FIG. 4a, the length of the zero-energy portion 404 and 406 is set to D. In another embodiment, as illustrated in FIG. 4b the symbol includes an FFT portion 408 and a zero-energy portion 410.

Figure 5A:
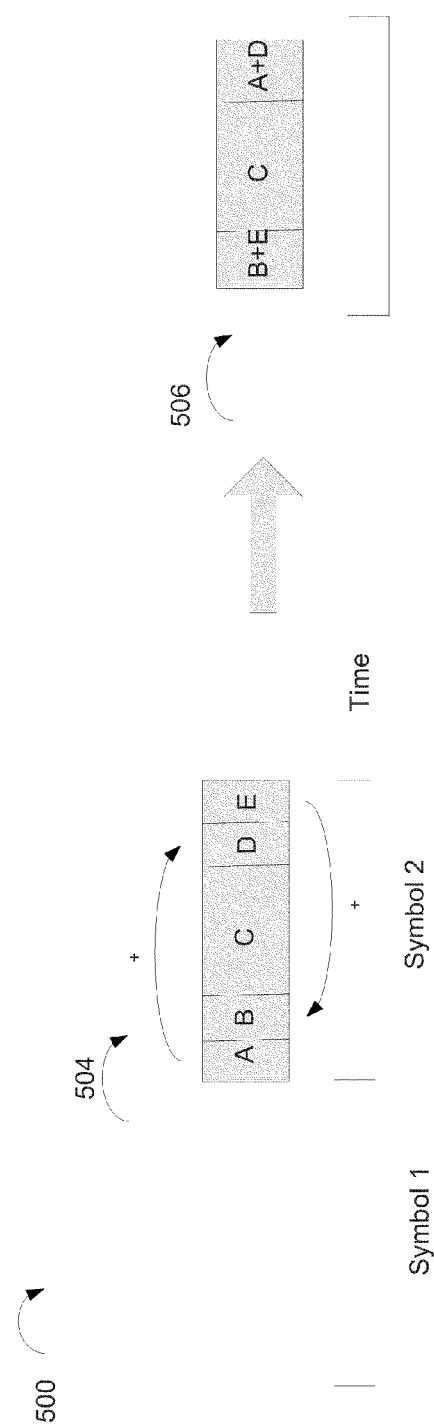
FIGS. 5A and 5B illustrate an example scheme of the operation of a receiving terminal when a signal is received.
Figure 5B:
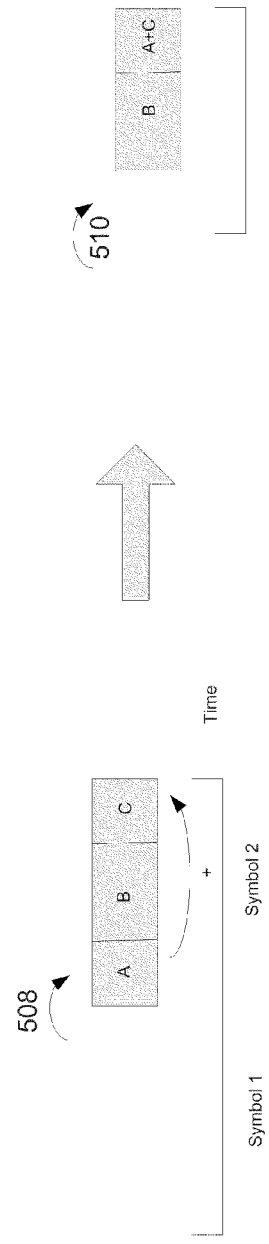

FIG. 5a illustrates an example scheme of the operation of a receiving terminal when a signal is received. In one embodiment, a signal 504 received at the receiving terminal is divided into 5 portions, A, B, C, D and E. In one aspect, the total length of B, C and D is equal to the length of the FFT portion. The lengths of A, B, D, and E are all the same and equal to the length of the zero-energy portion. The received portion A is delayed and then added to the received portion D, while the received portion E is advanced and then added to the received portion B. The resultant signal 506 includes three portions, B+E, C, and A+D. In another embodiment, as illustrated in FIG. 5b, the receiver divides the received signal 508 into 3 portions, A, B, and C. The length of portion B is equal to the length of the FFT portion. The lengths of A and C are equivalent to each other. The received portion A is delayed by an amount equal to the FFT portion, and then added to the received portion C. The resultant signal 510 includes two portions, B and A+C. The length of the resultant signal 510 is equal to the FFT portion, and may be further processed (e.g., using an FFT operation to convert to the frequency domain to extract symbols in individual tones). By employing the schemes illustrated in FIGS. 5*a* and 5*b*, the negative effect of timing mismatch between a transmitting computer terminal a receiving computer terminal can be mitigated, and signal processing can occur in a normal fashion.

FIG. 6 illustrates how the signal formats described in FIG. 4 and the receiver algorithm described in FIG. 5 help to rectify the negative effects of timing mismatch. With reference now to FIG. 6*a*, received signal 602 is behind the receiver symbol interval 604. Resultant signal 606 represents the result of a receiver operation being employed on a received signal, similar to the operation described in FIG. 5. It is to be appreciated that in the original signal 602, the FFT portion (A,B) includes an integer number of periods of tone signals. The resultant signal (B,A) 606 is identical to the original signal (A,B) in the FFT portion, except for a time shift. Similarly, with reference now to FIG. 6*b*, received signal 608 is behind the receiver symbol interval 610. Resultant signal 612 represents the modified received signal 608 after a receiver operation (e.g. similar to the operation described in FIG. 5) is performed. It is to be appreciated that in the original signal 608, the FFT portion (A,B) includes an integer number of periods of tone signals. The resultant signal (B,A) 612 is identical to the original signal (A,B) in the FFT portion, except for a time shift. Hence, in either scenario depicted in FIGS. 6*a*-6*b*, the receiver manages to get the resultant signal, which is of the length of the FFT portion and includes an integer number of tone signals, and therefore successfully overcomes the problem caused by the timing mismatch between a received signal and a receiver symbol interval.

Figure 7:
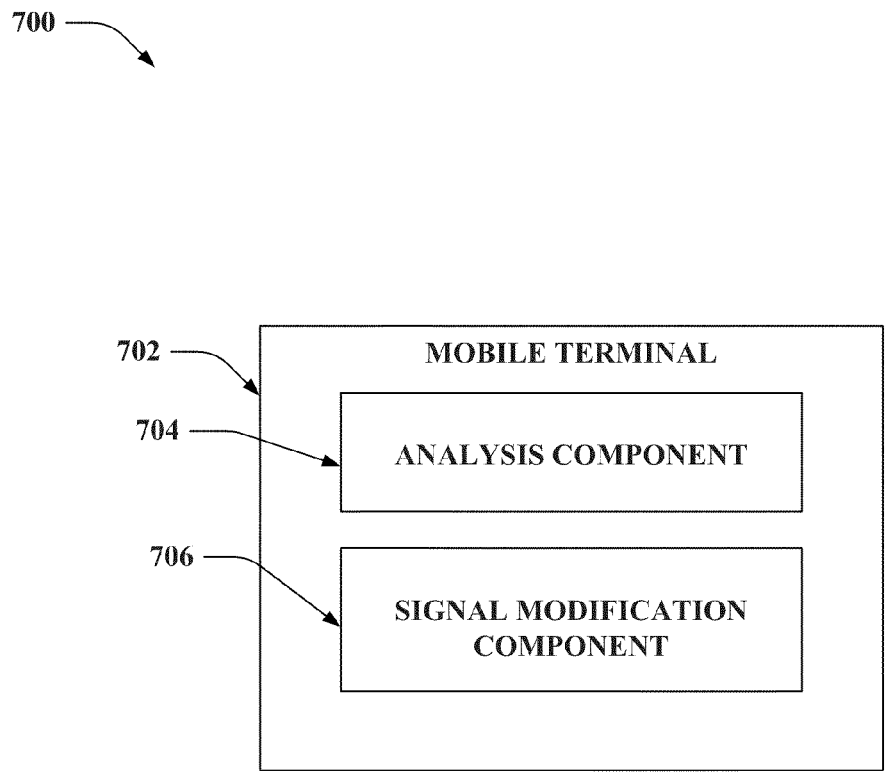
FIG. 7 is an illustration of an example system that mitigates the affects of asynchronous behavior when transmitting a data signal.

Referring now to FIG. 7, an ad hoc communications system 700 is illustrated. System 700 comprises one or more mobile terminals 702. Each of the mobile terminals comprises an analysis component 704 and a signal modification component 706. In one aspect, during the pre-preamble portion of a data burst, the analysis component 704 aids in determining whether a time asynchrousity exists in the communications system 700. It is to be appreciated that in this example, system 700 is a peer-to-peer (e.g. ad hoc) communications network, however, any communications system can implement the system described infra. Analysis component 704 determines the extent of the time offset between the transmission of communication pairs. After this determination is made, the signal modification component 706 can be employed. In one embodiment, signal modification component 706 mitigates the effects of any time-latency discovered by the analysis component 704 by employing a time-shifting scheme. More particularly, for example, signal modification component 706 can employ a zero padding method. Zero padding allows for the transmission of a series of zeroes at any point during the transmission of a data signal. In one aspect, the zero padding will be employed to the extent that the amount of zeroes added to the signal will result in a time-shift that is less than or equal to the length of the measured time latency to the beginning and/or end of a data transmission. Additionally or alternatively, a repeat of the end of a symbol (e.g. the cyclic prefix) can be appended to one or both ends of the transmission.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 8:
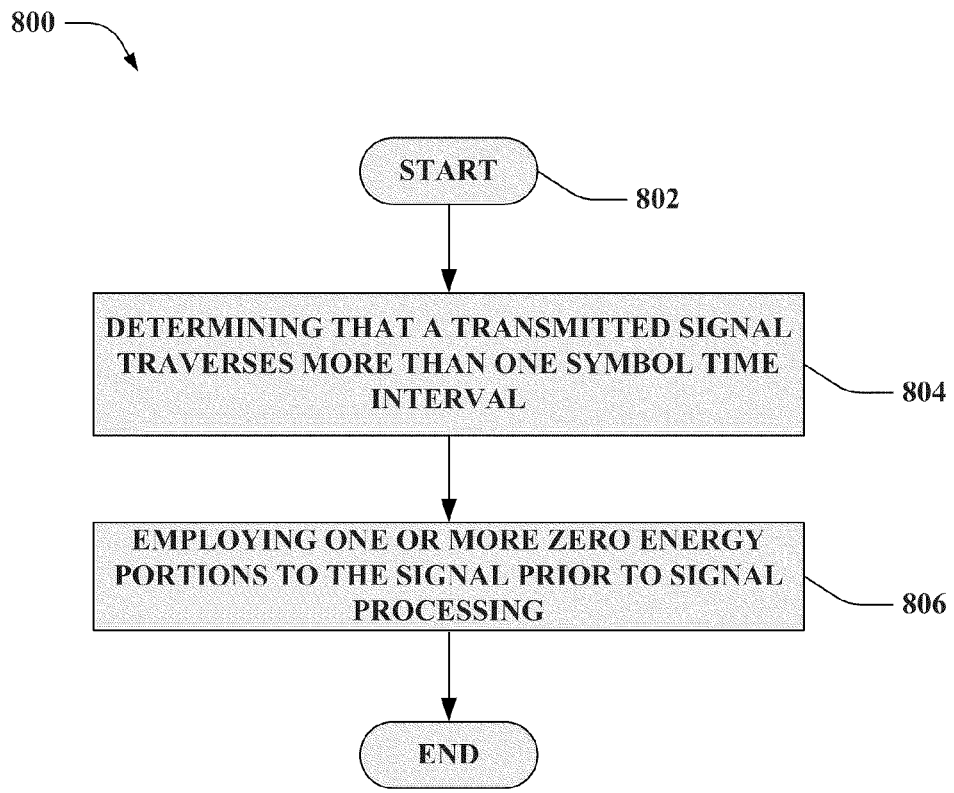
FIG. 8 is an illustration of an example methodology that mitigates the affects of asynchronous behavior when transmitting a data signal.

With reference now to FIG. 8, methodology 800 starts at 802 and at 804, a mobile terminal detects that a signal traverses more than one symbol time interval. In one embodiment, after detecting that a signal traverses more than one symbol time interval, the mobile terminal determines the severity of the time offset by determining a maximum time offset value corresponding to the signal. Such time-asynchronous behavior, for example, can cause difficulty at the receiver of the receiving mobile terminal with regard to properly processing the received signal. This difficulty is alleviated at 806, wherein, in one aspect, data signals transmitted subsequent to the determination at 804 are time shifted by appending a zero energy portion to an initial and/or terminal portion of the received signal.

Figure 9:
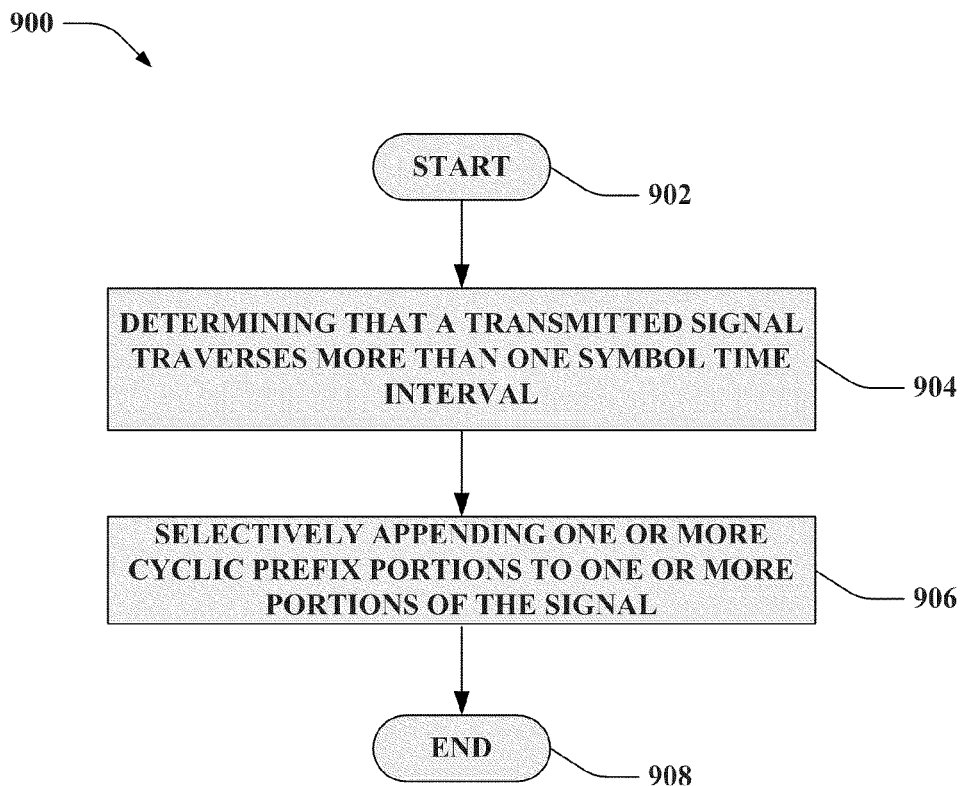
FIG. 9 is an illustration of another example methodology that mitigates the affects of asynchronous behavior when transmitting a data signal.

Referring now to FIG. 9, a methodology a methodology 900 begins at 902 and at 904, a first mobile terminal detects that a signal traverses more than one symbol time interval. In one embodiment, the first and one or more second mobile terminals operate in a peer-to-peer wireless communication network. Continuing with the methodology at 906, the first mobile terminal employs a time-shifting scheme during the pre-preamble portion of a logical data burst in order to mitigate the non-synchronous behavior of the mobile terminals. In one aspect, the cyclic prefix of the signal can be appended to the beginning and/or end of the signal to be transmitted. By attaching the cyclic prefix, the receiving one or more second terminals can process the entire received signal such that no initial portion of the received signal will be missing because of the time-asynchronous behavior.

Figure 10:
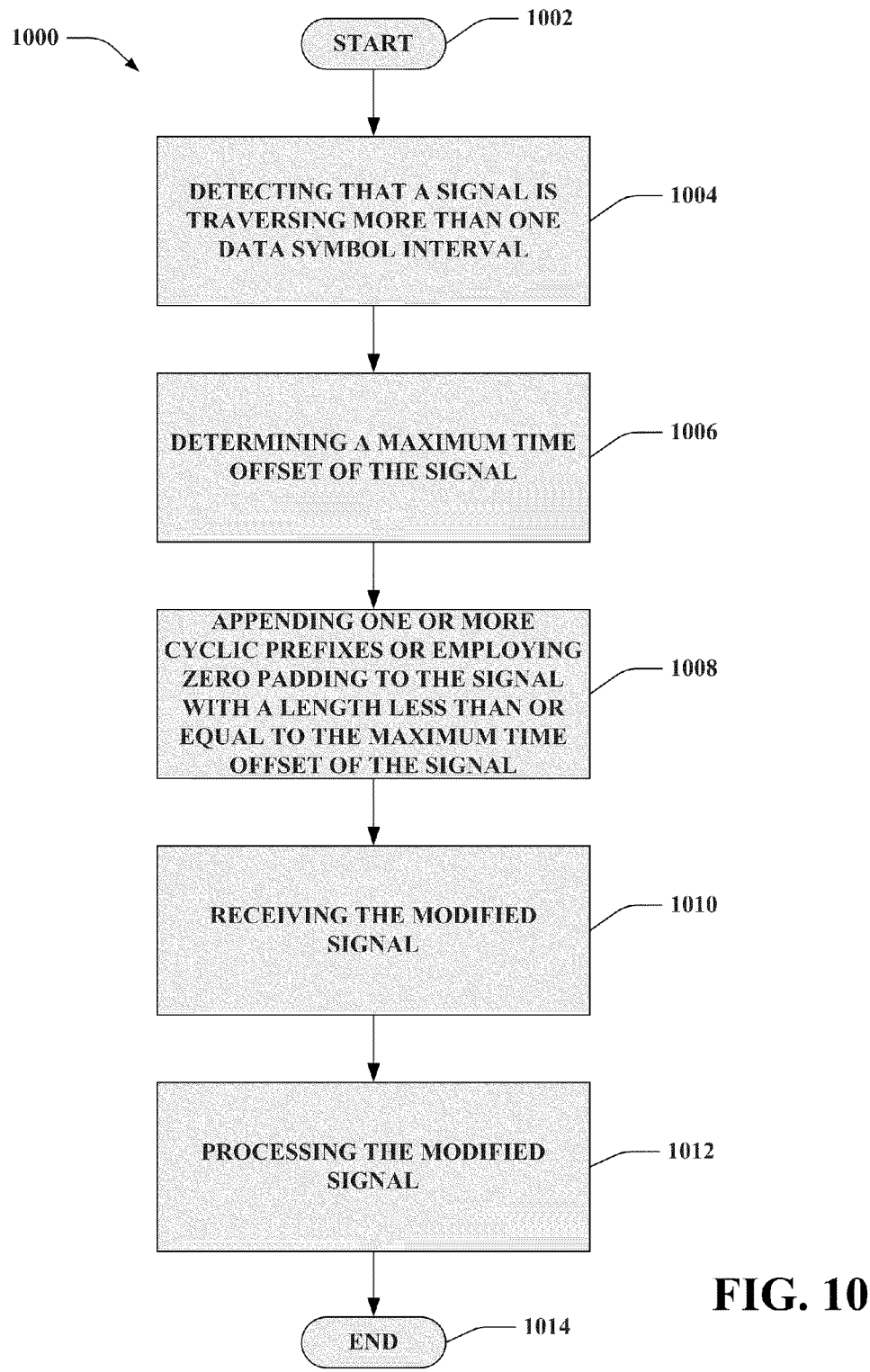
FIG. 10 is an illustration of another example methodology that mitigates the affects of asynchronous behavior when transmitting a data signal.

With reference now to FIG. 10, an example methodology 1100 is illustrated that facilitates rectifying a non-synchronous data signal transmission. The methodology 1100 starts at 1102 and at 1104, a first mobile device initiates the process of transmitting a data signal to one or more second mobile devices by determining whether asynchronous behavior has occurred. More particularly, in one embodiment, after the user of the first mobile device has selected one or more destination mobile devices, a sync operation is employed to allow for optimized data transfer. If however, at 1104, asynchronous time behavior is detected (e.g. detecting that a single data signal traverses more than one symbol), the methodology proceeds to 1106. At 1106, the first mobile device determines the severity of the asynchronous time behavior. In particular, the length of the time offset created by the asynchronous behavior is determined. At 1108, in one aspect, a cyclic prefix is appended to the beginning and/or end of subsequent signals transmitted form the first mobile device. By appending the cyclic prefix to the transmitted signals, the receiving mobile terminal can employ a signal processing procedure (e.g. FFT) to all portions of a received signal, rather than not processing a beginning portion of a signal because of a time delay. Additionally or alternatively, a zero padding procedure can be implemented at the beginning and end of the transmitted signal as another way of ensuring proper signal processing.

Figure 11:
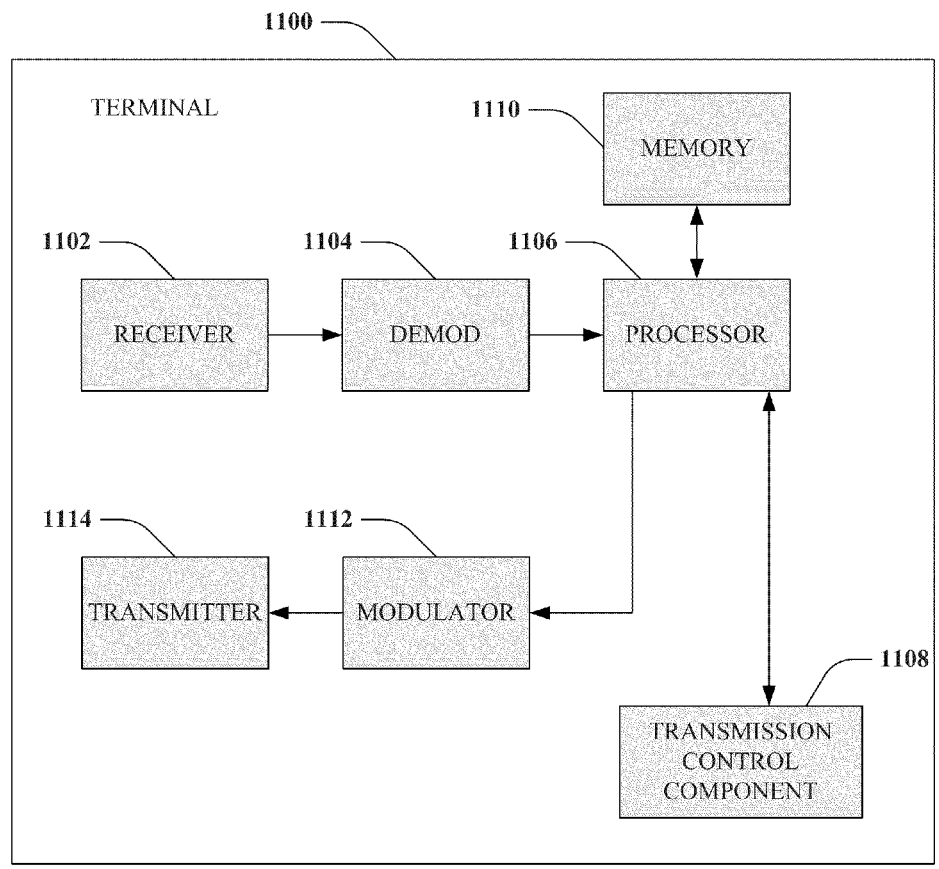
FIG. 11 illustrates a system that provides for other sector communication in accordance with one or more aspects presented herein.

FIG. 11 is an illustration of a terminal or user device 1100 that provides for other sector communication in a wireless communication environment in accordance with one or more aspects set forth herein. Terminal 1100 comprises a receiver 1102 that receives a signal, for instance one or more receive antennas, and performs typical actions (e.g., filters, amplifies, downconverts, etc.) the received signal and digitizes the conditioned signal to obtain samples. A demodulator 1104 can demodulate the samples and provide received pilot symbols to a processor 1106.

Processor 1106 can be a processor dedicated to analyzing information received by receiver component 1102 and/or generating information for transmission by a transmitter 1114. Processor 1106 can be a processor that controls one or more components of terminal 1100, and/or a processor that analyzes information received by receiver 1102, generates information for transmission by a transmitter 1114, and controls one or more components of terminal 1100. Processor 1106 can utilize any of the methodologies described herein, including those described with respect to FIGS. 8-10.

In addition, terminal 1100 can include a transmission control component 1108 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 1108 can be incorporated into the processor 1106. It is to be appreciated that transmission control component 1108 can include transmission control code that performs analysis in connection with determining receipt of acknowledgement.

Terminal 1100 can additionally comprise memory 1110 that is operatively coupled to processor 1106 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1110 of the subject systems and methods is intended to comprise, without being limited to, these and any other suitable types of memory. Processor 1106 is connected to a symbol modulator 1112 and transmitter 1114 that transmits the modulated signal.

Figure 12:
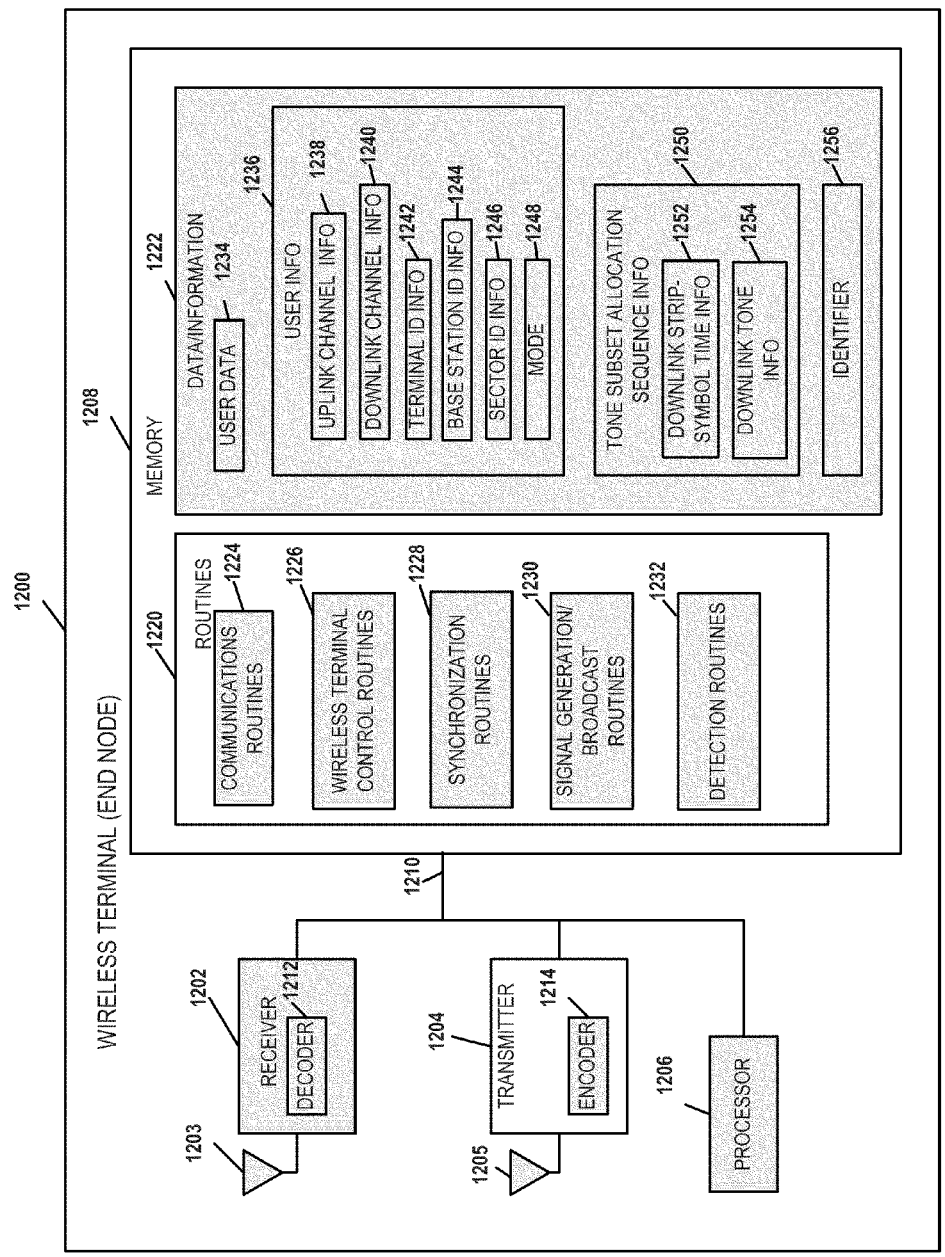
FIG. 12 is an illustration of an example wireless terminal (e.g., mobile device, end node, . . . ) implemented in accordance with various aspects described herein.

FIG. 12 illustrates an example wireless terminal (e.g., end node, mobile device, . . . ) 1200 which can be used as any wireless terminal. Wireless terminal 1200 implements the tone subset allocation sequences. Wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (not shown) is coupled to receiver 1202. An antenna 1205 used for transmitting signals is coupled to transmitter 1204.

The processor 1206 (e.g., a CPU) controls operation of wireless terminal 1200 and implements methods by executing routines 1220 and using data/information 1222 in memory 1208.

Data/information 1222 includes user data 1234, user information 1236, tone subset allocation sequence information 1250, and an identifier 1256. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by the base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by the base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224, wireless terminal control routines 1226, synchronization routines 1228, signal generation/broadcast routines 1230, and detection routines 1232. Communications routines 1224 control the various communications protocols used by WT 1200. For example, communications routines 1224 may enable communicating via a wide area network (e.g., with the base station) and/or a local area peer-to-peer network (e.g., directly with disparate wireless terminal(s)). By way of further example, communications routines 1224 may enable receiving a broadcast signal. Wireless terminal control routines 1226 control basic wireless terminal 1200 functionality including the control of the receiver 1202 and transmitter 1204. Synchronization routines 1228 control synchronizing wireless terminal 1000 to a received signal (e.g., from the base station). Peers within a peer-to-peer network may also be synchronized to the signal. For example, the received signal may be a Beacon, a PN (pseudo random) sequence signal, a pilot signal, etc. Further, the signal may be periodically obtained and a protocol (e.g., associated with synchronization routines 1228) also known to peers may be utilized to identify intervals corresponding to distinct functions (e.g., peer discovery, paging, traffic). Signal generation/broadcast routines 1230 control creating a message for transmission during an identified peer discovery interval. A symbol and/or tone associated with the message may be selected based upon a protocol (e.g., associated with signal generation/broadcast routines 1230). Moreover, signal generation/broadcast routines 1230 may control sending the message to peers within the peer-to-peer network. Signal generation/broadcast routines 1230 may utilize a reversible function or an irreversible function to transfer peer discovery signals based upon identifier 1256. Detection routines 1232 control detection and identification of peers based upon messages received during an identified peer discovery interval. Detection routines 1232 may utilize a similar function (e.g., reversible, irreversible) as compared to signal generation/broadcast routines 1230 to determine an identity of a peer. Further, detection routines 1232 may identify peers based at least in part upon information retained in a buddy peer list (e.g., that may be included in data/information 1222 of memory 1208 when employing an irreversible function).

Figure 13:
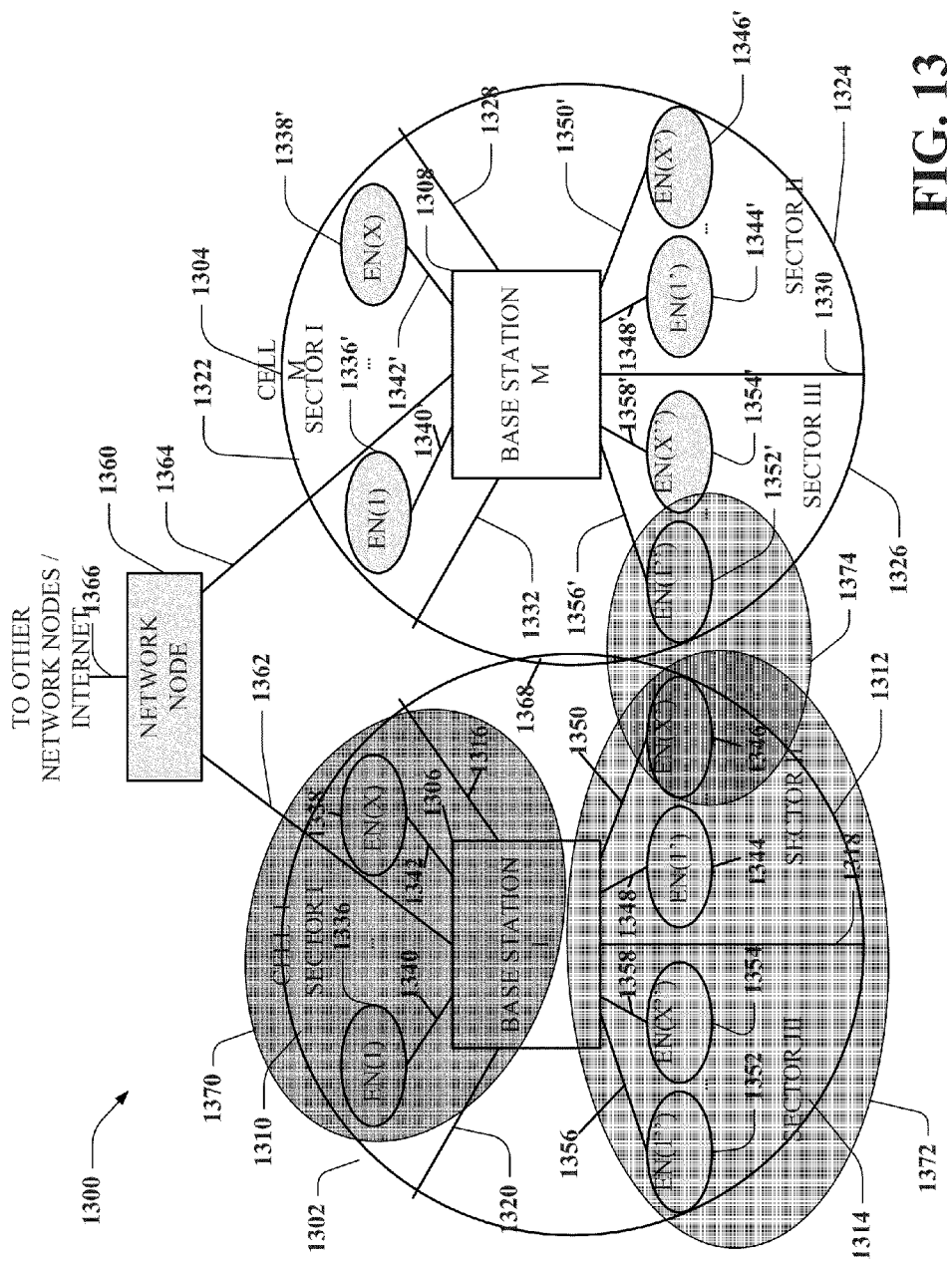
FIG. 13 is an illustration of an example communication system implemented in accordance with various aspects including multiple cells.

FIG. 13 depicts an example communication system 1300 implemented in accordance with various aspects including multiple cells: cell I 1302, cell M 1304. Note that neighboring cells 1302, 1304 overlap slightly, as indicated by cell boundary region 1368, thereby creating potential for signal interference between signals transmitted by base stations in neighboring cells. Each cell 1302, 1304 of system 1300 includes three sectors. Cells which have not be subdivided into multiple sectors (N=1), cells with two sectors (N=2) and cells with more than 3 sectors (N>3) are also possible in accordance with various aspects. Cell 1302 includes a first sector, sector I 1310, a second sector, sector II 1312, and a third sector, sector III 1314. Each sector 1310, 1312, 1314 has two sector boundary regions; each boundary region is shared between two adjacent sectors.

Sector boundary regions provide potential for signal interference between signals transmitted by base stations in neighboring sectors. Line 1316 represents a sector boundary region between sector I 1310 and sector II 1312; line 1318 represents a sector boundary region between sector II 1312 and sector III 1314; line 1320 represents a sector boundary region between sector III 1314 and sector I 1310. Similarly, cell M 1304 includes a first sector, sector I 1322, a second sector, sector II 1324, and a third sector, sector III 1326. Line 1328 represents a sector boundary region between sector I 1322 and sector II 1324; line 1330 represents a sector boundary region between sector II 1324 and sector III 1326; line 1332 represents a boundary region between sector III 1326 and sector I 1322. Cell I 1302 includes a base station (BS), base station I 1306, and a plurality of end nodes (ENs) (e.g., wireless terminals) in each sector 1310, 1312, 1314. Sector I 1310 includes EN(1) 1336 and EN(X) 1338 coupled to BS 1306 via wireless links 1340, 1342, respectively; sector II 1312 includes EN(1') 1344 and EN(X') 1346 coupled to BS 1306 via wireless links 1348, 1350, respectively; sector III 1314 includes EN(1") 1352 and EN(X") 1354 coupled to BS 1306 via wireless links 1356, 1358, respectively. Similarly, cell M 1304 includes base station M 1308, and a plurality of end nodes (ENs) in each sector 1322, 1324, 1326. Sector I 1322 includes EN(1) 1336' and EN(X) 1338' coupled to BS M 1308 via wireless links 1340', 1342', respectively; sector II 1324 includes EN(1') 1344' and EN(X') 1346' coupled to BS M 1308 via wireless links 1348', 1350', respectively; sector 3 1326 includes EN(1") 1352' and EN(X") 1354' coupled to BS 1308 via wireless links 1356', 1358', respectively.

System 1300 also includes a network node 1360 which is coupled to BS I 1306 and BS M 1308 via network links 1362, 1364, respectively. Network node 1360 is also coupled to other network nodes, e.g., other base stations, AAA server nodes, intermediate nodes, routers, etc. and the Internet via network link 1366. Network links 1362, 1364, 1366 may be, e.g., fiber optic cables. Each end node, e.g., EN(1) 1336 may be a wireless terminal including a transmitter as well as a receiver. The wireless terminals, e.g., EN(1) 1336 may move through system 1300 and may communicate via wireless links with the base station in the cell in which the EN is currently located. The wireless terminals, (WTs), e.g., EN(1) 1336, may communicate with peer nodes, e.g., other WTs in system 1300 or outside system 1300 via a base station, e.g., BS 1306, and/or network node 1360. WTs, e.g., EN(1) 1336 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Local area peer-to-peer communication may also be supported by communication system 1300. For example, a common spectrum may be utilized for both local area peer-to-peer communication as well as communication via the wide area network (e.g., cellular infrastructure network). Wireless terminals may communicate with other peers via a local area peer-to-peer network such as peer-to-peer networks 1370, 1372, and 1374. Although three peer-to-peer networks 1370-1374 are depicted, it is to be appreciated that any number, size, shape, etc. of peer-to-peer networks may be supported. For instance, each peer-to-peer network 1370-1374 may support transfer of signals directly between wireless terminals. Further, each peer-to-peer network 1370-1374 may include wireless terminals within a similar geographic area (e.g., within range of one another). For example, EN(1) 1336 may communicate with EN(X) 1338 by way of the local area peer-to-peer network 1370. However, it is to be appreciated that wireless terminals need not be associated with the same sector and/or cell to be included in a common peer-to-peer network. Further, peer-to-peer networks may overlap (e.g., EN(X') 1346 may leverage peer-to-peer networks 1372 and 1374). Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Figure 14:
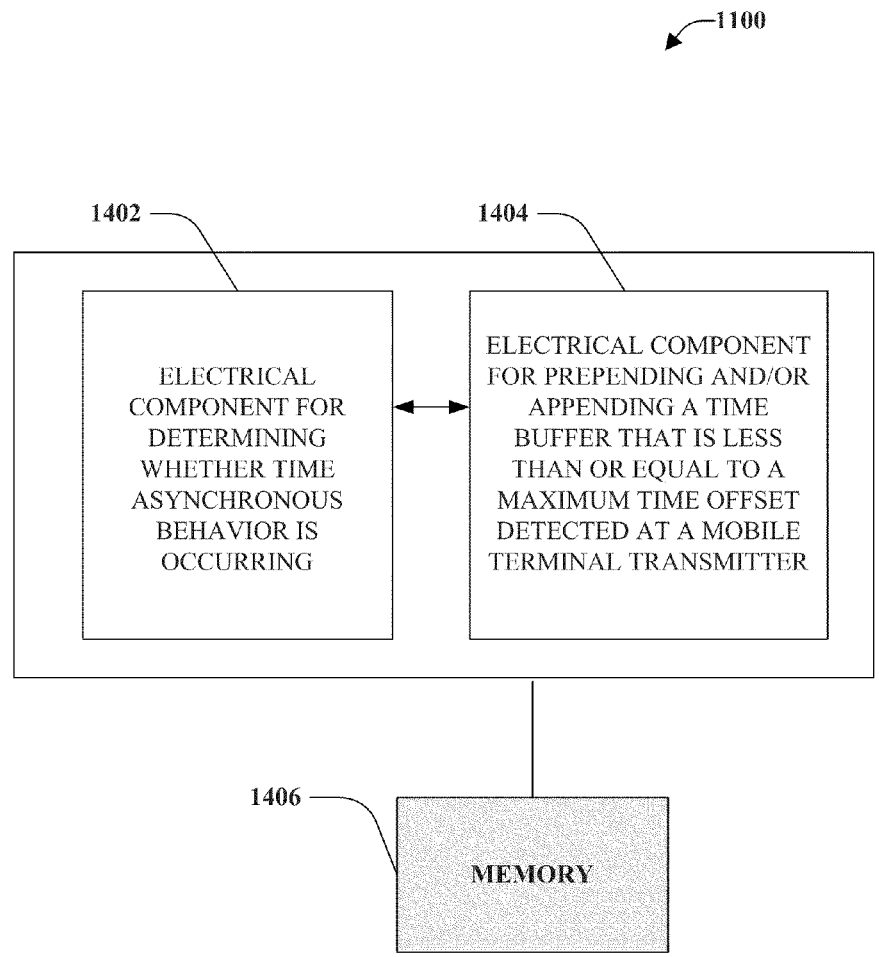
FIG. 14 is an illustration of an example system that enables mitigating the affects of asynchronous behavior when transmitting a data signal.

Referring now to FIG. 14, a system 1400 that facilitates rectifying a non-synchronous data signal transmission. System 1400 can include an electrical component 1402 for determining whether a transmitting mobile terminal and one or more receiving mobile terminals are properly time synched. More particularly, in one embodiment, during the pre-preamble portion of a logical data burst, electrical component 1402 determines whether a transmitted signal traverses more than one symbol time interval. In one aspect, if a transmitted signal is found to traverse more than one symbol time behavior, asynchronous time behavior is found by electrical component 1402, and electrical component 1404 is employed to mitigate the resulting data transmission errors by employing one or both of a cyclic prefix attachment procedure and a zero padding procedure.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a first mobile terminal in a peer-to-peer network, comprising:
    determining that said first mobile terminal and one or more receiving mobile terminals are communicating in an asynchronous manner;
    determining a maximum time offset due to said asynchronous communication;
    generating a zero padded symbol including a first zero-energy padding portion and a non-zero energy portion, said first zero-energy padding portion including zero energy, said non-zero energy portion including signal energy; and
    transmitting said zero padded symbol,
    wherein said first zero-energy padding portion of the zero padded symbol precedes said non-zero energy portion of the zero padded symbol, said first zero-energy padding portion is larger than said determined maximum time offset, and a second zero-energy padding portion is positioned, in said zero padded symbol, following said non-zero energy portion.

2. The method of claim 1, wherein said first zero-energy padding portion is twice said determined maximum time offset.

3. The method of claim 1, wherein said non-zero energy portion is an FFT portion.

4. A method of operating a first mobile terminal in a peer-to-peer network, comprising:
    determining that said first mobile terminal and one or more receiving mobile terminals are communicating in an asynchronous manner;
    determining a maximum time offset due to said asynchronous communication;
    generating a zero padded symbol including a first zero-energy padding portion and a non-zero energy portion, said first zero-energy padding portion including zero energy, said non-zero energy portion including signal energy; and
    transmitting said zero padded symbol,
    wherein said first zero-energy padding portion of the zero padded symbol precedes said non-zero energy portion of the zero padded symbol, said zero padded symbol further includes a second zero-energy padding portion, generating a zero padded symbol includes positioning said first zero-energy padding portion in said zero padded symbol before said non-zero energy portion and positioning said second zero-energy padding portion in said zero padded symbol after said non-zero energy portion, said first and second zero-energy padding portions are the same size, and said first and second zero-energy padding portions are equal to said maximum time offset.

5. A first mobile terminal in a peer-to-peer network, comprising:
    a determination module for determining that said first mobile terminal and one or more receiving mobile terminals are communicating in an asynchronous manner;
    a module for determining a maximum time offset due to said asynchronous communication;
    a symbol generation module for generating a zero padded symbol including a first zero-energy padding portion and a non-zero energy portion, said first zero-energy padding portion including zero energy, said non-zero energy portion including signal energy; and
    a transmitter module for transmitting said zero padded symbol,
    wherein said first zero-energy padding portion of the zero padded symbol precedes said non-zero energy portion of the zero padded symbol, and
    wherein said first zero-energy padding portion is larger than said determined maximum time offset, and said symbol generation module is further for positioning a second zero-energy padding portion, in said zero padded symbol, following said non-zero energy portion.

6. The first mobile terminal of claim 5,
    wherein said module for generating a zero padded symbol includes a module for positioning said first zero-energy padding portion in said zero padded symbol before said non-zero energy portion.

7. The first mobile terminal of claim 6, wherein said first and second zero-energy padding portions are the same size.

8. A first mobile terminal in a peer-to-peer network, comprising:
    means for determining that said first mobile terminal and one or more receiving mobile terminals are communicating in an asynchronous manner;
    means for determining a maximum time offset due to said asynchronous communication;
    means for generating a zero padded symbol including a first zero-energy padding portion and a non-zero energy portion, said first zero-energy padding portions including zero energy, said non-zero energy portion including signal energy; and
    means for transmitting said zero padded symbol,
    wherein said first zero-energy padding portion of the zero padded symbol precedes said non-zero energy portion of the zero padded symbol, said first-zero energy padding portion is larger than said determined maximum time offset, and said means for generating a zero padded symbol is further configured to position a second zero-energy padding portion, in said zero padded symbol, following said non-zero energy portion.

9. The first mobile terminal of claim 8, wherein said means for generating a zero padded symbol is further configured to position said first zero-energy padding portion in said zero padded symbol before said non-zero energy portion.

10. The first mobile terminal of claim 9, wherein said first and second zero-energy padding portions are the same size.

11. A non-transitory machine readable medium including machine executable instructions, for use in a first mobile terminal, said non-transitory machine readable medium comprising:
   instructions for causing said first mobile terminal to determine that said first mobile terminal and one or more receiving mobile terminals are communicating in an asynchronous manner;
   instructions for causing said first mobile terminal to determine a maximum time offset due to asynchronous communication;
   instructions for causing said first mobile terminal to generate a zero padded symbol including a first zero-energy padding portion and a non-zero energy portion, said first zero-energy padding portion including zero energy, said non-zero energy portion including signal energy; and
   instructions for causing said first mobile terminal to transmit said zero padded symbol,
   wherein said first zero-energy padding portion of the zero padded symbol precedes said non-zero energy portion of the zero padded symbol, said first zero-energy padding portion is larger than said determined maximum time offset, and said instructions for generating a zero padded symbol further include instructions for positioning a second zero-energy padding portion in said zero padded symbol after said non-zero energy portion.

12. The non-transitory machine readable medium of claim 11, wherein said instructions for generating a zero padded symbol further include instructions for positioning said first zero-energy padding portion in said zero padded symbol before said non-zero energy portion.

13. The non-transitory machine readable of claim 12, wherein said first and second zero-energy padding portions are the same size.

14. A first mobile communications device, comprising:
   at least one processor configured to control said first mobile communications device to:
      determine that said first mobile communications device and one or more receiving mobile communications device are communicating in an asynchronous manner;
      determine a maximum time offset due to said asynchronous communication;
      generate a zero padded symbol including a first zero-energy padding portion and a non-zero energy portion, said first zero-energy padding portion including zero energy, said non-zero energy portion including signal energy; and
      transmit said zero padded symbol; and
   a memory coupled to said at least one processor,
   wherein said first zero-energy padding portion of the zero padded symbol precedes said non-zero energy portion of the zero padded symbol, said first-zero energy padding portion is larger than said determined maximum time offset, and a second zero-energy padding portion is positioned, in said zero padded symbol, following said non-zero energy portion.

\* \* \* \* \*